(12) United States Patent
Ryu et al.

(10) Patent No.: US 12,154,550 B2
(45) Date of Patent: Nov. 26, 2024

(54) ELECTRONIC APPARATUS AND CONTROL METHOD THEREROF

(71) Applicant: SAMSUNG ELECTRONICS CO., LTD., Suwon-si (KR)

(72) Inventors: Seonghan Ryu, Suwon-si (KR); Jongsun Lee, Suwon-si (KR); Yubin Seo, Suwon-si (KR); Ikhee Shin, Suwon-si (KR); Hyungrai Oh, Suwon-si (KR); Eunji Lee, Suwon-si (KR); Yongjin Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 326 days.

(21) Appl. No.: 17/673,466

(22) Filed: Feb. 16, 2022

(65) Prior Publication Data

US 2022/0293090 A1 Sep. 15, 2022

Related U.S. Application Data

(63) Continuation of application No. PCT/KR2021/010110, filed on Aug. 3, 2021.

(30) Foreign Application Priority Data

Mar. 9, 2021 (KR) .................. 10-2021-0031026

(51) Int. Cl.
*G10L 15/16* (2006.01)
*G06F 40/295* (2020.01)
(Continued)

(52) U.S. Cl.
CPC .......... *G10L 15/063* (2013.01); *G06F 40/295* (2020.01); *G10L 15/16* (2013.01); *G10L 2015/0631* (2013.01); *G10L 2015/088* (2013.01)

(58) Field of Classification Search
CPC .................. G10L 15/063; G10L 15/16; G10L 2015/0631; G10L 2015/088; G06F 40/295; G06F 16/35
See application file for complete search history.

(56) References Cited

U.S. PATENT DOCUMENTS 10,121,467 B1   11/2018  Gandhe et al.
11,270,185 B1 *  3/2022  Ouyang .................. G06F 16/35
(Continued)

FOREIGN PATENT DOCUMENTS

CN        109949797 A     6/2019
KR     10-0877477 B1     1/2009
(Continued)

OTHER PUBLICATIONS

International Search Report and Written Opinion dated Dec. 7, 2021, issued by the International Searching Authority in counterpart International Application No. PCT/KR2021/010110 (PCT/ISA/210 and PCT/ISA/237).

*Primary Examiner* — Daniel C Washburn
*Assistant Examiner* — Penny L Caudle
(74) *Attorney, Agent, or Firm* — Sughrue Mion, PLLC

(57) ABSTRACT

A control method of an electronic apparatus includes clustering words included in a plurality of domains respectively into a plurality of clustering groups based on information corresponding to the plurality of domains; obtaining an embedding vector between the words and the plurality of clustering groups based on learning data corresponding to respective domains, the words, and mass text learning data; and generating one or more final clustering groups of the words based on the obtained embedding vector and the plurality of clustering group.

5 Claims, 6 Drawing Sheets

(51) Int. Cl.
*G10L 15/06* (2013.01)
*G10L 15/08* (2006.01)
*G06F 16/35* (2019.01)

(56) References Cited

U.S. PATENT DOCUMENTS

| | | |
|---|---|---|
| 2011/0145251 A1 | 6/2011 | Lee et al. |
| 2014/0136184 A1 | 5/2014 | Hatsek et al. |
| 2016/0027437 A1 | 1/2016 | Hong et al. |
| 2017/0308613 A1* | 10/2017 | Zhu .................. G06F 16/9535 |
| 2020/0035228 A1 | 1/2020 | Seo et al. |
| 2020/0193983 A1 | 6/2020 | Choi |
| 2020/0294489 A1 | 9/2020 | Ding et al. |
| 2021/0043190 A1 | 2/2021 | Wang et al. |

FOREIGN PATENT DOCUMENTS

| | | |
|---|---|---|
| KR | 10-1055363 B1 | 8/2011 |
| KR | 10-2012-0047377 A | 5/2012 |
| KR | 10-1255957 B1 | 4/2013 |
| KR | 10-1302563 B1 | 9/2013 |
| KR | 10-1333485 B1 | 11/2013 |
| KR | 10-2015-0066160 A | 6/2015 |
| KR | 10-1724398 B1 | 4/2017 |
| KR | 10-1725354 B1 | 4/2017 |
| KR | 10-1727139 B1 | 4/2017 |
| KR | 10-2019-0098928 A | 8/2019 |
| KR | 10-2020-0050620 A | 5/2020 |
| KR | 10-2020-0072907 A | 6/2020 |
| KR | 10-2020-0081562 A | 7/2020 |
| KR | 10-2020-0083751 A | 7/2020 |
| KR | 10-2168319 B1 | 10/2020 |
| KR | 10-2020-0131700 A | 11/2020 |
| KR | 10-2204395 B1 | 1/2021 |

\* cited by examiner

ELECTRONIC APPARATUS AND CONTROL METHOD THEREROF

CROSS-REFERENCE TO RELATED APPLICATION(S)

This application is a by-pass continuation application of International Application No. PCT/KR2021/010110, filed on Aug. 3, 2021, which is based on and claims priority to Korean Patent Application No. 10-2021-0031026, filed on Mar. 9, 2021, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus configured to clarify a type of entity name of a word which is used in speech recognition and a control method thereof.

2. Description of Related Art

To provide a speech recognition server, many developers generate a word and domain which corresponds to a service provided by respective developers, and store them as a database in a server. A database of the server may store a named entity (or, syntax, string, word sequence) with respect to a named entity type belonging to the respective domains. The named entity may refer to one word such as a name of a restaurant, region, or the like or a combination of words. Because various developers store the respective domains and words, the same word may belong to a type of domain different from one another. In this case, the domain corresponding to the word may become ambiguous. Accordingly, when an electronic apparatus classifies the domain, there is the problem of computational quantity increasing because of having to use a multi-hot feature which is extracted based on matching information of the word, and the information for classifying the domain being ambiguous.

Accordingly, there is a need for technology which clearly defines and classifies the correlation of the domain and the word.

SUMMARY

Provided are an electronic apparatus which raises accuracy of speech recognition by classifying domains by clarifying a meaning of words and a control method thereof.

According to an aspect of the disclosure, a method of controlling an electronic apparatus includes: clustering words included in a plurality of domains respectively into a plurality of clustering groups based on information corresponding to the plurality of domains; obtaining an embedding vector between the words and the plurality of clustering groups based on learning data corresponding to respective domains, the words, and mass text learning data; and generating one or more final clustering groups of the words based on the obtained embedding vector and the plurality of clustering groups.

The obtaining the embedding vector may include obtaining a first frequency in which the words are included in at least one domain from among the plurality of domains based on the learning data corresponding to the plurality of domains.

The obtaining the embedding vector may include obtaining a second frequency in which words are included in the plurality of clustering groups by using a word representation model.

The word representation model may be one from among a Bag-of-Words model, a Word2Vec model, or a One-hot model.

The obtaining the embedding vector may further include obtaining an embedding vector between the words and words in-between other words based on the mass text learning data.

The obtaining the embedding vector may include obtaining the embedding vector between the words and the plurality of clustering groups based on the obtained first frequency, the obtained second frequency, and the obtained embedding vector between the words.

The generating the one or more final clustering groups may include combining, into one clustering group, a plurality of clustering groups including words that are less than or equal to a pre-set distance apart based on the obtained embedding vector.

According to another aspect of the disclosure, an electronic apparatus includes a communication interface configured to receive a plurality of domains and word information included in the plurality of domains; and a processor configured to: perform clustering of words included in respective domains into a plurality of clustering groups based on information corresponding to the plurality of domains; obtain an embedding vector between the words and the plurality of clustering groups based on learning data corresponding to the respective domains, the words, and mass text learning data; and generate one or more final clustering groups of the words based on the obtained embedding vector and the plurality of clustering groups.

The processor may be further configured to obtain a first frequency in which the words are included in at least one domain from among the plurality of domains based on the learning data corresponding to the plurality of domains.

The processor may be further configured to obtain a second frequency in which the words are included in the plurality of clustering groups by using a word representation model.

The word representation model may be one from among a Bag-of-Words model, a Word2Vec model, or a One-hot model.

The processor may be further configured to obtain an embedding vector between the words and words in-between other words based on the mass text learning data.

The processor may be further configured to obtain the embedding vector between the words and the plurality of clustering groups based on the obtained first frequency, the obtained second frequency, and the obtained embedding vector between the words.

The processor may further configured to combine, into one clustering group, a plurality of clustering groups including words that are less than or equal to a pre-set distance apart based on the obtained embedding vector.

According to another aspect of the disclosure, a non-transitory computer readable storage medium stores programs for performing a control method of an electronic apparatus, the method including clustering words included in a plurality of domains respectively into a plurality of clustering groups based on information corresponding to the plurality of domains; obtaining an embedding vector between the words and the plurality of clustering groups based on learning data corresponding to respective domains, the words, and mass text learning data; and generating one or more final clustering groups of the words based on the obtained embedding vector and the plurality of clustering groups.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
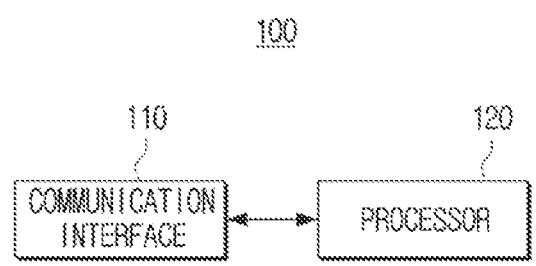
FIG. 1 is a block diagram showing a configuration of an electronic apparatus according to an embodiment.

Embodiments will be described in greater detail below with reference to the accompanying drawings. The embodiments of the disclosure may be variously modified. Specific embodiments may be described in the drawings and described in detail in the detailed description. However, the specific embodiments described in the accompanied drawing are merely to assist in a comprehensive understanding of the disclosure. Accordingly, those of ordinary skill in the art will recognize that the technical idea is not limited by the specific embodiments described in the accompanied drawings, and should be interpreted to include all modifications, equivalents and/or alternatives of the embodiments without departing from the scope and spirit of the disclosure.

Terms including ordinal numbers such as first and second may be used to described various elements, but it should be understood that these elements are not limited by the above-described terms. The above-described terms may be used for only the purpose of distinguishing one element from another element.

It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof. When a certain element is indicated as being "coupled with/to" or "connected to" another element, it may be understood as being directly coupled with/to or connected to the another element, but it may also be understood as a different element being present therebetween. On the other hand, when a certain element is indicated as "directly coupled with/to" or "directly connected to" another element (e.g., second element), it may be understood a different element not being present therebetween.

A "module" or "part" with respect to the elements used herein may perform at least one function or operation. Further, the "module" or "part" may perform a function or an operation using a hardware, a software, or by a combination of the hardware and software. In addition, a plurality of "modules" or a plurality of "parts", except for a "module" or a "part" which needs to perform in a specific hardware or is performed in at least one processor, may be integrated to at least one module. A singular expression includes a plural expression, unless otherwise specified.

In describing the disclosure, the order of respective steps is to be understood as non-limiting unless the order of respective steps need to be performed such that a preceding step must be performed logically and temporally prior to a following step. That is, except for exceptional cases as described above, even if a process described as the following step is performed preceding a process described as the preceding step, it does not influence the nature of the disclosure and the scope of protection should also be defined regardless of the order of the step. Further, in the disclosure, the description "A or B" may not only be defined as selectively referring to any one from among A and B, but also referring to including A and B both. In addition, the term "include" used herein may have a comprehensive meaning of further including other elements in addition to the elements listed as being included.

In the disclosure, only elements necessary to describing the electronic apparatus and control method have been described, and elements unnecessary for describing electronic apparatus and control method have not been mentioned. Further, the disclosure should not be interpreted in an exclusive meaning of including only the elements described, and should be interpreted in a non-exclusive meaning of including other elements also.

Further to the above, in describing the disclosure, in case it is determined that the detailed description of related known technologies may unnecessarily confuse the gist of the disclosure, the detailed description will be abridged or omitted. Respective embodiments may be independently realized or operated, but the respective embodiments may also be realized or operated in combination.

FIG. 1 is a block diagram showing a configuration of an electronic apparatus according to an embodiment.

Referring to FIG. 1, the electronic apparatus 100 may include a communication interface 110 and a processor 120. For example, the electronic apparatus 100 may include a server, a cloud, or the like.

The communication interface 110 may be configured to perform communication with an external apparatus. The communication interface 110 may transmit and receive data by using a wired or wireless communication method with the external apparatus. For example, the communication interface 110 may include a module capable of performing communication in a 3rd generation (3G) method, a long term evolution (LTE) method, a 5th generation (5G) method, a Wi-Fi method, a Bluetooth method, a digital multimedia broadcasting (DMB) method, an advanced television systems committee (ATSC) method, a digital video broadcasting (DVB) method, a local area network (LAN) method, or the like. The communication interface 110 which performs communication with the external apparatus may be referred to as a communicator, a communication module, a transceiver, or the like.

The communication interface 110 may receive a plurality of domains and word information included in the plurality of domains. Third party developers may develop various domains (or, capsules) which are supported in the speech recognition service. For example, the domain may include an educational domain, an arts domain, a regional information domain, a business and finance domain, a Q&A domain, a health domain, a sports domain, and the like. The word may be a common noun or a proper noun included in the respective domains. In an embodiment, the educational domain may include a word such as high-school and middle-school, or names of the high-school and middle-school, or the like. The regional information domain may include a word such as Seoul an Incheon.

The third party developers may build a word (e.g., proper noun) based dictionary for the recognition of natural language. The communication interface 110 may receive the domain and information on the word included in the domain from the third party developer. Further, the electronic apparatus 100 may store a value on the received domain and the word included in the domain received in the memory in a list format.

The processor 120 may learn and recognize with respect to the domain and the word by using an artificial intelligence model stored in the memory. The function related with the artificial intelligence according to the disclosure may be operated through the processor 120 and the memory. In an embodiment, the processor 120 may include one or a plurality of processors. The one or plurality of processors may be a generic-use processor such as a central processing unit (CPU), an application processor (AP) and a digital signal processor (DSP), a graphics dedicated processor such as a vision processing unit (VPU), or an artificial intelligence dedicated processor such as a neural processing unit (NPU). The one or plurality of processors may control for the input data to be processed according to a word learning artificial intelligence model stored in the memory. Alternatively, based on the one or plurality of processors being an artificial intelligence dedicated processor (or, interoperating AI cloud), the artificial intelligence dedicated processor may be designed in a hardware structure specialized for a processing of the word learning artificial intelligence model.

The word learning artificial intelligence model may be created through a learning process. Here, being created through learning may refer to the word learning artificial intelligence model being created to generate learning data based on a basic artificial intelligence model being trained using multiple learning data by a word learning algorithm. Examples of a learning algorithm include a supervised learning, a unsupervised learning, a semi-supervised learning, or a reinforcement learning, but the embodiment is not limited to the above-described example.

The word learning artificial intelligence model may include a plurality of neural network layers. The respective neural network layers may include a plurality of weight values, and may perform neural network processing through processing between processing results of a previous layer and the plurality of weight values. The plurality of weight values of the plurality of neural network layers may be optimized by a learning result of the artificial intelligence model. For example, the plurality of weight values may be updated for a loss value or a cost value obtained by the artificial intelligence model during the learning process to reduced or optimized. The artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but the embodiment is not limited to the above-described examples.

The processor 120 may perform clustering of the word included in the respective domains to a plurality of groups based on information of the plurality of domains. In other words, the same words included in the respective domains or words of the same meaning may be classified as one group. The words included in the clustered group may be the same words or words of the same meaning, and because the respective words are included in domains different from one another, the domain may include information different from one another.

The processor 120 may obtain an embedding vector between the words and the plurality of clustering groups based on learning data on the respective domains, the clustered words, and mass text learning data. The learning data on the respective domains may be a domain and data having learned the relationship of words included in the domain by using an artificial intelligence model. The mass text learning data may be data which learned, by using the artificial intelligence model, of words used when a normal user uses the speech recognition service without distinguishing domains. The embedding vector data may be data which converts the respective words to a value and represents it as a vector, and represents a distance between the respective vectors. The distance of the embedding vector being close may refer to a word which may be classified to a similar meaning or similar groups, and the distance of the embedding vector being far may refer to a word which may be classified to a different meaning or different groups. In addition, the word of which the distance of the embedding vector is close may be used as prediction word.

For example, the processor 120 may obtain a first frequency in which words are included in at least one domain from among the plurality of domains based on the learning data on the respective domains. Further, the processor 120 may obtain a second frequency in which the words are included in the plurality of clustered groups by using a word representation model. In addition, the processor 120 may obtain an embedding vector between vocabularies in-between the word and a different word based on mass text learning data. The processor 120 may obtain the embedding vector between the words and the plurality of clustering groups based on the obtained first frequency, the obtained second frequency, and the obtained embedding vector between the words. The processor 120 may generate a final clustering group of the word based on the obtained embedding vector and the plurality of clustering groups. That is, the processor 120 may generate the plurality of clustering groups which include word of less than or equal to a pre-set distance as one clustering group based on the obtained embedding vector.

According to an embodiment, the word representation model may be one from among a Bag-of-Words model, a Word2Vec model, or a One-hot model. The word representation model may be a model representing a word by using a frequency of occurrence of the word. For example the word representation model may allocate a unique integer index to respective words, and generate a vector which includes the frequency of occurrence of a word token at respective index locations. Further, the word representation model may add weights to respective words by using the frequency of occurrence and an inverse document frequency of respective words. The frequency of occurrence may refer to the number of times a word appears, and the inverse document frequency may refer to a reciprocal number of the frequency of occurrence. Further, the weights may refer to a degree of importance of the words.

The word representation model may obtain an important word and a distance between the respective words through the above-described process, and predict the word which may appear thereafter when one word has appeared.

The electronic apparatus 100 may raise accuracy of the speech recognition function by identifying the meaning of the word and the word predicted to appear within one cluster based on performing clustering of words by using the obtained vector.

Figure 2:
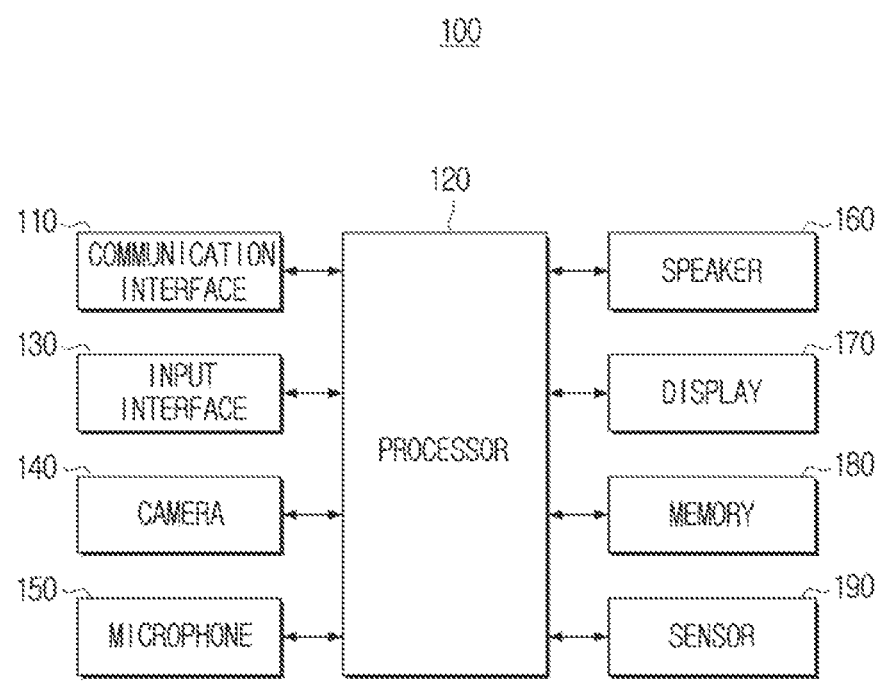
FIG. 2 is a block diagram showing a detailed configuration of an electronic apparatus according to an embodiment.

FIG. 2 is a block diagram showing a detailed configuration of an electronic apparatus according to an embodiment.

Referring to FIG. 2, the electronic apparatus 100 may include a communication interface 110, a processor 120, an input interface 130, a camera 140, a microphone 150, a speaker 160, a display 170, a memory 180, and a sensor 190. Because the communication interface 110 is the same as in FIG. 1, the detailed description thereof will be omitted.

The input interface 130 may receive a command from a user. Alternatively, the input interface 130 may include an input and output port, and may receive or output data. Based on the input interface 130 including the input and output port, the input and output port may include a port of a high-definition multimedia interface (HDMI), a display port (DP), a red, green and blue (RGB), a digital visual interface (DVI), a universal serial bus (USB), a Thunderbolt, a local area network (LAN), or the like. The input interface 130 may perform a function of receiving a command or data externally, and may be referred to as an inputter, an input module, an input unit or the like.

The camera 140 may capture a surrounding environment of the electronic apparatus 100. Alternatively, the camera 140 may capture an expression, a motion, or the like of the user. The processor 120 may recognize a control command based on the captured expression or motion of the user, and perform a control operation which corresponds to the recognized control command. For example, the camera 140 may include a CCD sensor and a CMOS sensor. In addition, the camera 140 may include a RGB camera and a depth camera.

The microphone 150 may receive the user speech. The processor 120 may recognize a control command based on the input speech, and perform a control operation which corresponds to the recognized control command.

The speaker 160 may output a speech signal performed with speech processing. In addition, the speaker 160 may output information related to the input command of the user and the status of the electronic apparatus 100, information related to an operation, or the like in a voice or a notification sound.

The display 170 may output data processed in the processor 120 as an image. For example, the display 170 may be implemented as a liquid crystal display (LCD), an organic light emitting diode (OLED), a flexible display, a touch screen, or the like. Based on the display 170 being implemented as a touch screen, the electronic apparatus 100 may receive a control command through the touch screen.

The memory 180 may store data, an algorithm, an artificial intelligence model, or the like which perform a function of the electronic apparatus 100, and store programs, instructions, or the like which are operated in the electronic apparatus 100. The algorithm stored in the memory 180 may train the word learning artificial intelligence model by being loaded to the processor 120 by the control of the processor 120, and perform clustering of the input words by using the trained image word learning artificial intelligence model and recognize the clustered words. For example, the memory 180 may be implemented in the type of a read only memory (ROM), a random access memory (RAM), a hard disk drive (HDD), a solid state drive (SSD), a memory card, or the like.

The sensor 190 may detect objects in the surrounding of the electronic apparatus 100. The processor 120 may recognize a control instruction based on the detected signal, and perform a control operation which corresponds to the recognized control instruction. In addition, the sensor 190 may detect information on the surrounding environment of the electronic apparatus 100. The processor 120 may perform a corresponding control operation based on information on the surrounding environment detected in the sensor 190. For example, the sensor 190 may include an acceleration sensor, a gravity sensor, a gyro sensor, a geomagnetic sensor, a direction sensor, a motion recognition sensor, a proximity sensor, a voltmeter, an ammeter, a barometer, a hygrometer, a thermometer, a luminance sensor, a heat detection sensor, a touch sensor, an infrared sensor, an ultrasonic sensor, or the like The electronic apparatus 100 may include all of the above-described configurations, or may include only some of the configurations. In addition, the electronic apparatus 100 may further include other configurations which perform various functions in addition to the above-described configurations. In the above, the configuration of the electronic apparatus 100 has been described. A process of performing clustering of words will be described below.

Figure 3:
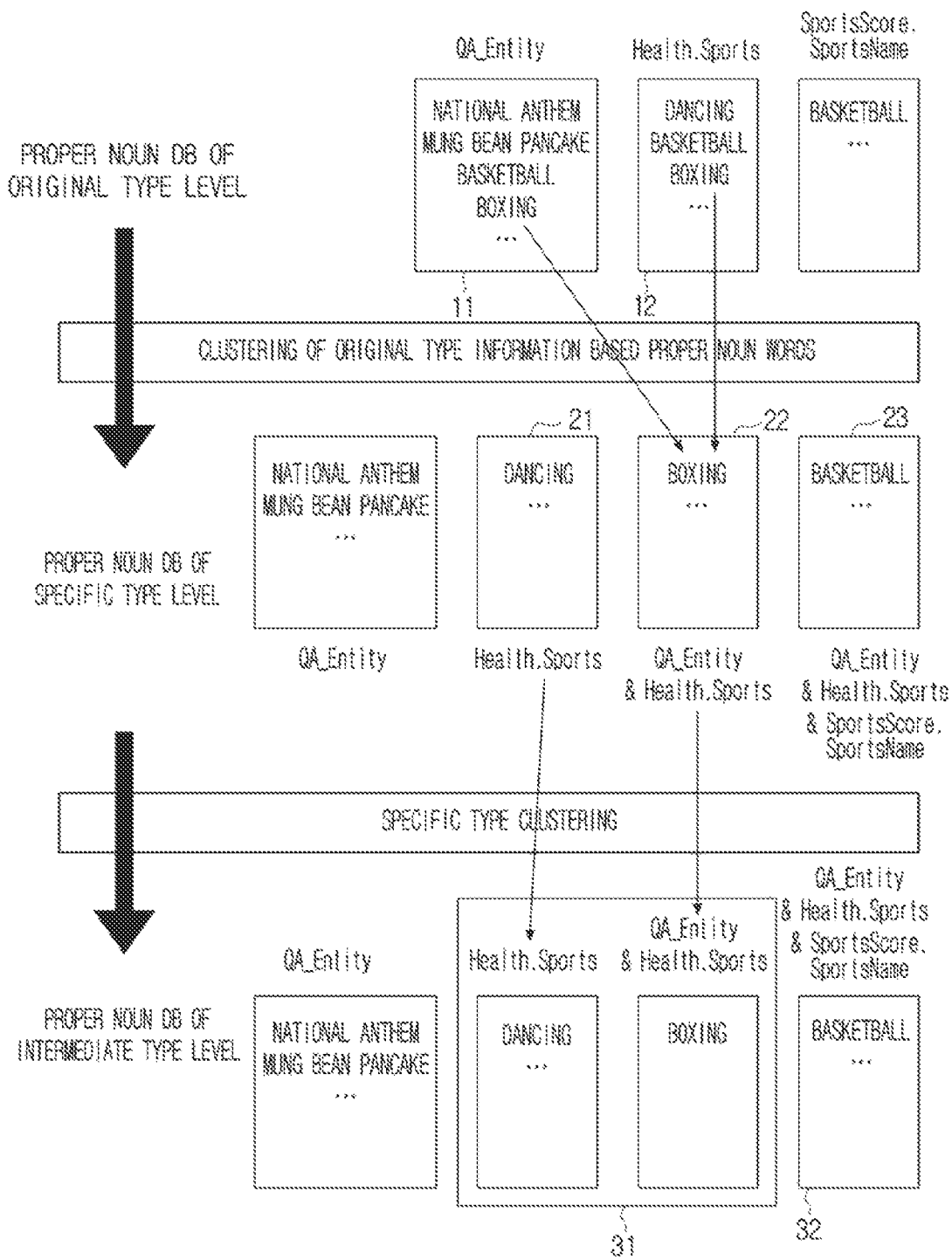
FIGS. 3 and 4 are diagrams showing a word database refinement process according to an embodiment.
Figure 4:
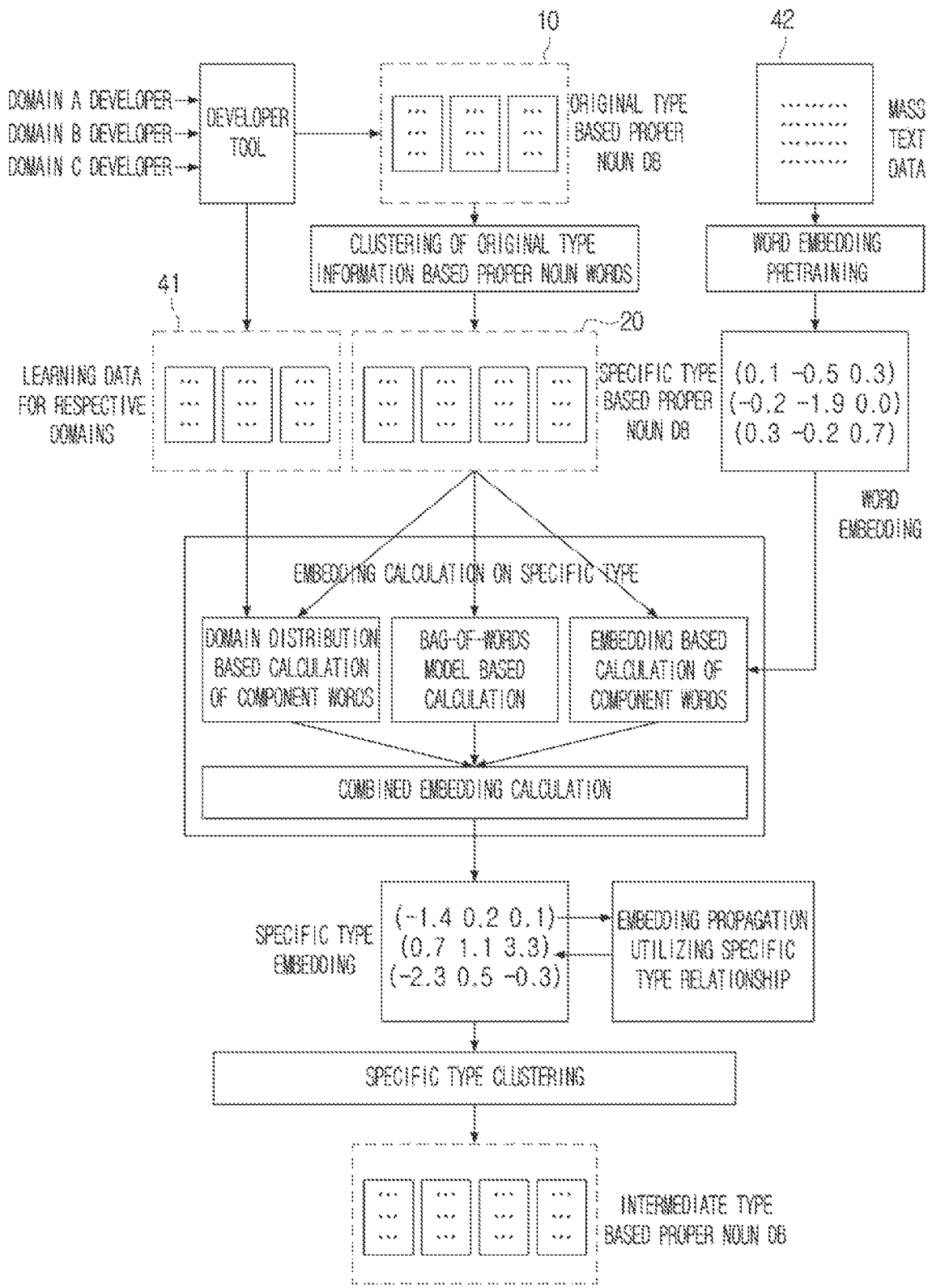

FIGS. 3 and 4 are diagrams of a word database refinement process according to an embodiment. The embodiment will be described with reference to both FIGS. 3 and 4.

Referring to FIGS. 3 and 4, the electronic apparatus may receive a domain and words included in the domain. The third party developers may generate a domain and words which are included in the domain that perform a service using a developer tool and transmit the generated domain and words to the electronic apparatus. For example, the electronic apparatus may receive words such as national anthem, Mung Bean Pancake, basketball, boxing, and the like together with QA_Entity 11, receive words such as dancing, basketball, boxing, and the like together with Health.Sports 12, and receive words such as basketball and the like together with SportsScore.SportsName. The domain and words received by the electronic apparatus may be referred to as an original type database 10 because it is data generated by the developer.

The electronic apparatus may perform a word clustering process based on the original type database. For example, because the words of national anthem and Mung Bean Pancake included in QA_Entity 11 are words included in only QA_Entity 11, the words may be generated as one clustering group and set as QA_Entity. That is, national anthem and Mung Bean Pancake may be included in the named entity type of QA_Entity. Because the word of boxing is included in QA_Entity 11 and Health.Sports 12, it may be set as QA_Entity & Health. Sports 22. That is, boxing may be included in the named entity type of QA_Entity & Health.Sports. Further, dancing may be set as Health.Sports 21, basketball may be set as QA_Entity & Health.Sports & SportsScore.SportsName 23 based on the above-described method. Because the group, which is clustered with the same words or words of the same meaning, has been classified with words based on a specific standard, the group may be referred to as a specific type database 20.

The electronic apparatus may generate learning data 41 of the respective domains which are trained for each of the domains received. The electronic apparatus may generate mass text learning data from a mass text data 42. Further, the electronic apparatus may calculate the domain distribution of words based on the learning data 41 of the respective domains. That is, the electronic apparatus may obtain the first frequency in which words are included in the domain based on the learning data 41 of the respective domains. In addition, the electronic apparatus may calculate a clustering distribution based on the word representation model. That is, the electronic apparatus may obtain a second frequency which is included in the clustered group based on the word representation model. For example, the word representation model may be one from among the Bag-of-Words model, the Word2Vec model, or the One-hot model. In addition, the electronic apparatus may calculate an embedding of words based on the mass text learning data. That is, the electronic apparatus may obtain the embedding vector between words and words in-between the other words based on the mass text learning data. The electronic apparatus may obtain a combined embedding vector between the word and the clustering group based on the obtained first frequency, second frequency, and the embedding vector. The electronic apparatus may generate one or more a final clustering groups by using the combined embedding vector and an embedding propagation method utilizing the specific type relationship (embedding propagation). For example, the dancing which is included in Health. Sports 21 and boxing which is included in QA_Entity & Health. Sports 22 may be classified as Health. Sports 31 which may best represent the meaning and may be generated as one clustering. If there is no related type with respect to basketball of QA_Entity & Health. Sports & SportsScore.SportsName 32, basketball may be set as a separate type. Words of similar meaning (or, clustering) may be classified as one clustering from a specific type database 20, and the classified clustering may be generated as the one or more final clustering groups.

The one or more final clustering groups generated through the above-described process may include the same words and words of the same meaning. Accordingly, the electronic apparatus may use the finally generated clustering group to quickly and accurately recognize the input speech, and output an appropriate response.

Figure 5A:
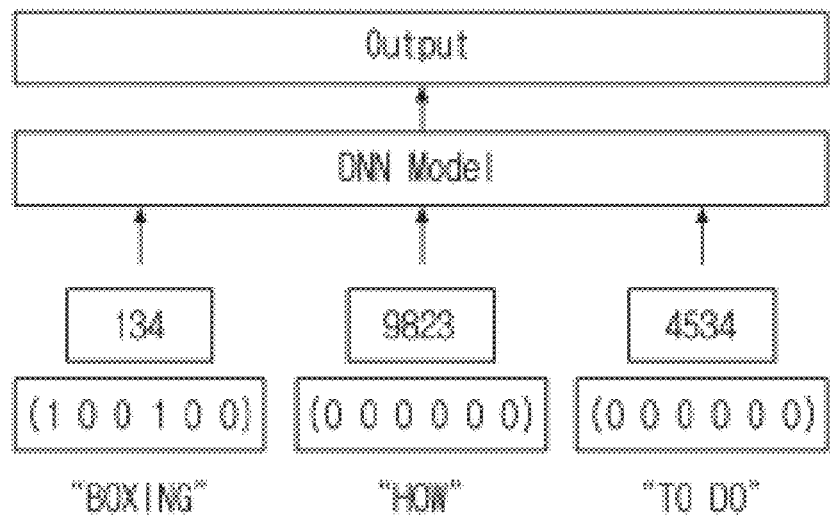
FIG. 5A is a diagram showing a domain classification model according to the related art.
Figure 5B:
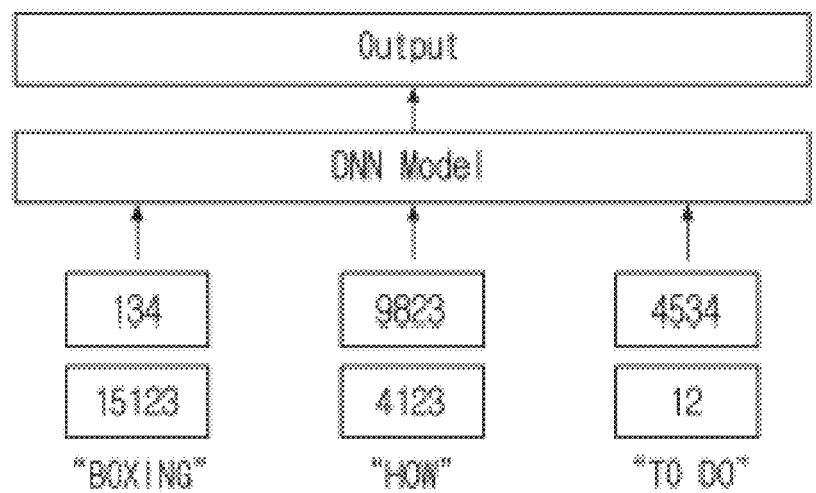
FIG. 5B is a diagram showing a domain classification model according to an embodiment.

FIG. 5A is a diagram of a domain classification model according to the related art. FIG. 5B is a diagram of a domain classification model according to an embodiment.

In the case of the model of the related art shown in FIG. 5A, regarding the word boxing which is not in the learning data being input, there may be the problem of not being able to recognize the word because the meaning is unknown. In addition, even when the word boxing is recognized based on the original type named entity classified by the developer, there may be difficultly for the electronic apparatus to recognize the meaning because boxing is included in both QA_Entity and Health. Sports as shown in FIG. 3.

However, according to the embodiment shown in FIG. 5B, even if boxing is not in the learning data because it is clustered in Health. Sports as a word similar to dancing and the like, the electronic apparatus may accurately recognize the meaning or group of boxing. Accordingly, the electronic apparatus and the control method thereof may accurately recognize the meaning or group even if a word which is not in the learning data is input by using a database which is accurately clustered to a final clustering group, and output an appropriate response.

In the above, the process of generating one or more final clustering groups by using the word learning artificial intelligence model has been described. A control method of the electronic apparatus will be described below.

Figure 6:
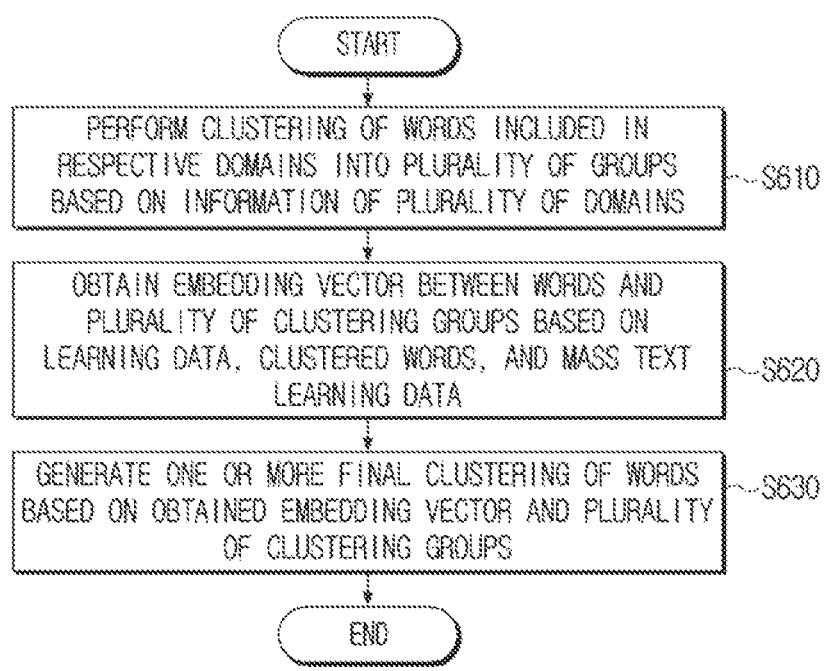
FIG. 6 is a flowchart showing a control method of an electronic apparatus according to an embodiment.

FIG. 6 is a flowchart of a control method of an electronic apparatus according to an embodiment.

Referring to FIG. 6, the electronic apparatus may perform clustering of words included in respective domains to a plurality of groups based on information corresponding to the plurality of domains (S610). The electronic apparatus may receive a domain and word information included in the domain from the respective developers. A domain or database on the words received from a developer may be referred to as an original type database. Further, the electronic apparatus may perform clustering of the same words or words identifiable as the same to one group. The database which was clustered based on the same word may be referred to as the specific type database.

The electronic apparatus may obtain an embedding vector between the words and the plurality of clustering groups based on learning data, the clustered words, and mass text learning data with respect to the respective domains (S620). For example, the electronic apparatus may obtain the first frequency in which words are included in at least one domain from among the plurality of domains based on the learning data on the respective domains. That is, the first frequency may refer to a frequency in which words are included in the respective domains. Further, the electronic apparatus may obtain the second frequency in which words are included in the plurality of clustered groups by using the word representation model. For example, one from among the Bag-of-Words model, the Word2Vec model, or the One-hot model may be included. That is, the second frequency may refer to a frequency in which words are included in the respective clustering groups. In addition, the electronic apparatus may obtain the embedding vector between words and words in-between the other words based on the mass text learning data. That is, the electronic apparatus may obtain information on words of a similar meaning from the database of general words. The electronic apparatus may obtain the embedding vector between the words and the plurality of clustering groups based on the obtained first frequency, the obtained second frequency, and the obtained embedding vector between the words.

The electronic apparatus may generate the final clustering groups of words based on the obtained embedding vector and the plurality of clustering groups (S630). For example, the electronic apparatus may generate the plurality of clustering groups which include words of less than or equal to a pre-set distance as one clustering group based on the obtained embedding vector.

The control method of the electronic apparatus according to one or more embodiments described above may be provided as a computer program product. The computer program product may include a software (S/W) program itself or a non-transitory computer readable medium stored with the S/W program.

The non-transitory computer readable medium may refer to a medium that stores data semi-permanently rather than storing data for a very short time, such as a register, a cache, a memory, or the like, and is readable by a device. Specifically, the above-described various applications or programs may be stored and provided in the non-transitory computer readable medium such as, for example, and without limitation, a compact disc (CD), a digital versatile disc (DVD), a hard disc, a Blu-ray disc, a USB, a memory card, a ROM, and the like.

While the disclosure has been illustrated and described with reference to example embodiments thereof, it will be understood that the example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A method of controlling an electronic apparatus, the method comprising:

clustering words included in a plurality of domains respectively into a plurality of clustering groups based on information corresponding to the plurality of domains;

obtaining an embedding vector between the words and the plurality of clustering groups based on learning data corresponding to the respective domains, the words, and mass text learning data; and generating one or more final clustering groups of the words based on the obtained embedding vector and the plurality of clustering groups, wherein the obtaining the embedding vector comprises:

obtaining a first frequency in which the words are included in at least one domain from among the plurality of domains based on the learning data corresponding to the respective domains, obtaining a second frequency in which the words are included in the plurality of clustering groups by using a word representation model, obtaining an embedding vector between the words and words in-between other words based on the mass text learning data, and obtaining the embedding vector between the words and the plurality of clustering groups based on the obtained first frequency, the obtained second frequency, and the obtained embedding vector between the words and the words in-between the other words, wherein the generating the one or more final clustering groups comprises obtaining a combined embedding vector between the words and the plurality of clustering groups based on the obtained first frequency, the obtained second frequency, and the obtained embedding vector between the words and the words in-between the other words and generating the one or more final clustering groups by using the combined embedding vector and an embedding propagation method utilizing a specific type relationship, and wherein the word representation model is configured to allocate a unique integer index to respective words, generate a vector which includes a frequency of occurrence of a word token at respective index locations, and add weights to the respective words by using the frequency of occurrence and an inverse document frequency of the respective words, the frequency of occurrence being a number of times a word appears and the inverse document frequency being a reciprocal number of the frequency of occurrence.

2. The method of claim 1, wherein the generating the one or more final clustering groups comprises combining, into one clustering group, a plurality of clustering groups including words that are less than or equal to a pre-set distance apart based on the obtained embedding vector between the words and the plurality of clustering groups.

3. An electronic apparatus comprising:

a communication interface configured to receive a plurality of domains and word information included in the plurality of domains; and a processor configured to:

perform clustering of words included in respective domains into a plurality of clustering groups based on information corresponding to the plurality of domains;

obtain an embedding vector between the words and the plurality of clustering groups based on learning data corresponding to the respective domains, the words, and mass text learning data; and generate one or more final clustering groups of the words based on the obtained embedding vector and the plurality of clustering groups, wherein the processor is further configured to:

obtain a first frequency in which the words are included in at least one domain from among the plurality of domains based on the learning data corresponding to the respective domains, obtain a second frequency in which the words are included in the plurality of clustering groups by using a word representation model, obtain an embedding vector between the words and words in-between other words based on the mass text learning data, obtain the embedding vector between the words and the plurality of clustering groups based on the obtained first frequency, the obtained second frequency, and the obtained embedding vector between the words and the words in-between the other words, obtain a combined embedding vector between the words and the plurality of clustering groups based on the obtained first frequency, the obtained second frequency, and the obtained embedding vector between the words and the words in-between the other words, and generate the one or more final clustering groups by using the combined embedding vector and an embedding propagation method utilizing a specific type relationship, and wherein the word representation model is configured to allocate a unique integer index to respective words, generate a vector which includes a frequency of occurrence of a word token at respective index locations, and add weights to the respective words by using the frequency of occurrence and an inverse document frequency of the respective words, the frequency of occurrence being a number of times a word appears and the inverse document frequency being a reciprocal number of the frequency of occurrence.

4. The electronic apparatus of claim 3, wherein the processor is further configured to combine, into one clustering group, a plurality of clustering groups including words that are less than or equal to a pre-set distance apart based on the obtained embedding vector between the words and the plurality of clustering groups.

5. A non-transitory computer readable storage medium which stores programs for performing a control method of an electronic apparatus, the method comprising:

clustering words included in a plurality of domains respectively into a plurality of clustering groups based on information corresponding to the plurality of domains;

obtaining an embedding vector between the words and the plurality of clustering groups based on learning data corresponding to respective domains, the words, and mass text learning data; and generating one or more final clustering groups of the words based on the obtained embedding vector and the plurality of clustering groups, wherein the obtaining the embedding vector comprises:

obtaining a first frequency in which the words are included in at least one domain from among the plurality of domains based on the learning data corresponding to the respective domains, obtaining a second frequency in which the words are included in the plurality of clustering groups by using a word representation model, obtaining an embedding vector between the words and words in-between other words based on the mass text learning data, and obtaining the embedding vector between the words and the plurality of clustering groups based on the obtained first frequency, the obtained second frequency, and the obtained embedding vector between the words and the words in-between the other words, wherein the generating the one or more final clustering groups comprises obtaining a combined embedding vector between the words and the plurality of clustering groups based on the obtained first frequency, the obtained second frequency, and the obtained embedding vector between the words and the words in-between the other words and generating the one or more final clustering groups by using the combined embedding vector and an embedding propagation method utilizing a specific type relationship, and wherein the word representation model is configured to allocate a unique integer index to respective words, generate a vector which includes a frequency of occurrence of a word token at respective index locations, and add weights to the respective words by using the frequency of occurrence and an inverse document frequency of the respective words, the frequency of occurrence being a number of times a word appears and the inverse document frequency being a reciprocal number of the frequency of occurrence.

* * * * *